United States Patent [19]
Johnson et al.

[11] Patent Number: 5,370,587
[45] Date of Patent: * Dec. 6, 1994

[54] HUB-CONTAINING ELEMENT RETENTION MECHANISM

[75] Inventors: Philip S. Johnson, Madison County, Ill.; Barry M. Newberg; Eugene F. Hildebrandt, both of St. Louis County, Mo.

[73] Assignee: Emerson Electric Co., St. Louis, Mo.

[ * ] Notice: The portion of the term of this patent subsequent to Jan. 4, 2011 has been disclaimed.

[21] Appl. No.: 144,672

[22] Filed: Oct. 28, 1993

Related U.S. Application Data

[63] Continuation-in-part of Ser. No. 927,017, Aug. 10, 1992, Pat. No. 5,275,577.

[51] Int. Cl.⁵ ............................................. F16H 55/30
[52] U.S. Cl. ................................... 474/166; 474/903
[58] Field of Search ............... 474/152, 166, 902, 903

[56] References Cited

U.S. PATENT DOCUMENTS

| | | | |
|---|---|---|---|
| 1,909,500 | 5/1933 | Ornitz | 474/903 X |
| 4,509,381 | 4/1985 | Ikemoto et al. | 474/903 X |
| 4,998,905 | 3/1991 | Martin | 474/903 X |
| 5,275,577 | 1/1994 | Hildebrandt et al. | 474/903 |

*Primary Examiner*—Michael Powell Buiz
*Attorney, Agent, or Firm*—Polster, Lieder, Woodruff & Lucchesi

[57] ABSTRACT

An improved mechanism for retaining a hub-containing element such as a pulley, fan, gear or the like, on a shaft wherein the shaft has a circumferential groove formed near its end and the element has a hub to engage the shaft with a plurality of flexible fingers formed around and extending onward from the hub. The fingers have a pawl disposed to drop into the circumferential groove on the shaft and thereby secure the element in place. The pawls can be of various configurations so as to both align properly with the groove and to accommodate tolerances in the shaft assembly. A protective collar surrounds the fingers and extends axially from the hub to protect the fingers from entanglement and breakage during manufacture, storage, or transportation. The shaft also has splines formed therein proximate the groove that matingly engage corresponding keyways formed inside the hub so that the shaft positively mates with the hub.

14 Claims, 4 Drawing Sheets

HUB-CONTAINING ELEMENT RETENTION MECHANISM

BACKGROUND OF THE INVENTION

This application is a continuation in part of application Ser. No. 07/927,017, filed Aug. 8, 1992, now U.S. Patent No. 5,275,577.

This invention relates to a hub and shaft mechanism, and more specifically to an improved mechanism for retaining and positioning a hub-containing element on a motor shaft.

Electric motor shafts with hub-containing elements, such as pulleys, fans, gears, impellers, and centrifugal actuators are well known in the art. For example, in home appliances, such as washing machines, an electric motor is used to drive a agitator mechanism. The electric motor is designed having a shaft with a pulley secured to the exposed end of the shaft. The pulley engages a drive belt means for translating the rotation of the motor shaft to the agitator assembly. We previously noted that pulley assemblies known to the art are complicated in construction and relatively expensive to manufacture. For example, prior art pulleys are stamped metal. The pulley is formed from two metal stampings, which are joined together mechanically in any desired way. Welding the parts together is often the preferred assembly method. After assembly, the pulley is mounted in its intended application. The motor shaft end which engages the pulley conventionally is threaded and the pulley is mounted on the shaft shaft and retained on the shaft by a suitably threaded nut and washer assembly. The mounting portion of the shaft, including the thread is, generally at least partially of a lesser diameter than the body of the shaft. A washer or other retaining ring is placed over the threaded portions so as to seat against the shoulder formed where the threaded diameter meets the greater shaft diameter. The pulley seats against the washer or retaining ring to prevent retrograde movement of the pulley. Usually another lock washer or retaining ring is slipped over the threaded diameter of the shaft and the nut is tightened thereon, securing the pulley in place. The threaded portion of the motor shaft is often formed in a special shape, that shape also being formed into the opening in the hub of the pulley so that the shaft engages the pulley and does not rotate therein.

This typical type of pulley and shaft assembly requires multiple parts: a washer or retainer ring, the pulley, which as indicated, is assembled from two metal halves, another retaining ring or washer, and the threaded nut. We had observed that if there were variations in the shaft assembly tolerance, motor to motor, washers or retaining rings that serve as spacers must be added to position the pulley appropriately on the shaft. This use of additional spacers added to the number of parts required to mount the pulley properly and added to the cost of construction.

To alleviate the drawbacks of the prior art pulley and shaft assemblies, we invented a pulley retention mechanism that used only the pulley and the shaft, requiring no other parts. That mechanism is the subject of the aforestated application Ser. No. 07/927,017 which issued as U.S. Pat. No. 5,275,577.

Our earlier pulley retention mechanism, in general, employs a motor shaft having a plurality of splines formed thereon and a circumferential groove proximate the splines. The pulley, has an axial hole, the hole having a plurality of complementary splines formed therein so as to engage the splines on the shaft. One or more fingers extend outward from around the hole and are disposed to engage the circumferential groove in the shaft to secure the pulley on the shaft. The retention mechanism as disclosed in application Ser. No. 07/927,017 functions well for its intended purposes. However, it was observed that during molding, packaging, and shipping the various fingers of the various pulleys can become entangled and sometimes break off resulting in waste and increased cost of production.

Furthermore we discovered that the drawbacks associated with prior art pulley arrangements, i.e. the use of multiple parts such as retainer rings, spacers, threaded nuts, etc., are encountered in other devices employing a shaft and hub-containing element assembly. During experimentation with our aforestated improved retention mechanism associated with the pulley and shaft, we discovered that the retention mechanism was not necessarily limited to a pulley and shaft assembly. The overall design of our retention mechanism can have multiple applications. We discovered that the mechanism can be used to secure any hub-containing element on a rotatable shaft. For example, the retention mechanism can be used to retain a hub-containing centrifugal actuator on a rotatable shaft. Moreover, the retention mechanism could be used to mount an impeller, fan, blower fan or gear on a rotatable shaft.

SUMMARY OF THE INVENTION

It is, therefore, one object of the present invention to provide a retention mechanism that can be used to secure any hub-containing element on a rotatable shaft that is defined merely by the hub-containing element and the shaft.

Yet another object of the present invention is to provide a retention mechanism for retaining a hub-containing element on a shaft that includes one or more fingers extending outwardly from the perimeter of the hub, the fingers disposed to Lock into a circumferential groove formed in the shaft.

Still another object of the invention is to provide a retention mechanism for retaining a hub-containing element on a shaft having an protective collar surrounding the fingers and extending axially outward from the hub to prevent the fingers of one element from becoming entangled with the fingers of one or more elements during packaging, transportation, or assembly.

Still another object of the present invention is to provide a retention mechanism for retaining a hub-containing element on a shaft wherein the annular collar has a plurality of internal indentations to prevent the hub-to-hub interlocking of multiple hub-containing elements.

Still another object of the invention is to provide a retention mechanism that includes the use of splines formed on the shaft that matingly engage grooves formed within the hub so that the shaft engages the hub and does not rotate therein.

Yet another object of the invention is to provide a retention mechanism that accommodates variable tolerances in the motor and shaft assembly.

In accordance with the invention, generally stated, a low cost retention mechanism is provided for mounting any hub-containing element on a rotatable shaft. The shaft has a circumferential groove formed in it and the hub-containing element has flexible fingers extending outward from the perimeter of the hub. The fingers have pawls located on the end. The pawls automatically drop into the groove formed in the shaft when the hub-containing element is assembled on the shaft. The circumferential groove on the shaft has sharp edges thereon so as to mate properly with the pawls to hold device in place. An protective collar surrounding the fingers extends outward axially from the hub to protect the fingers. The collar has a plurality of internal indentations that prevent the elements from interlocking hub-to-hub during molding, storage or transportation.

DESCRIPTION OF THE PREFERRED EMBODIMENT

Figure 1:
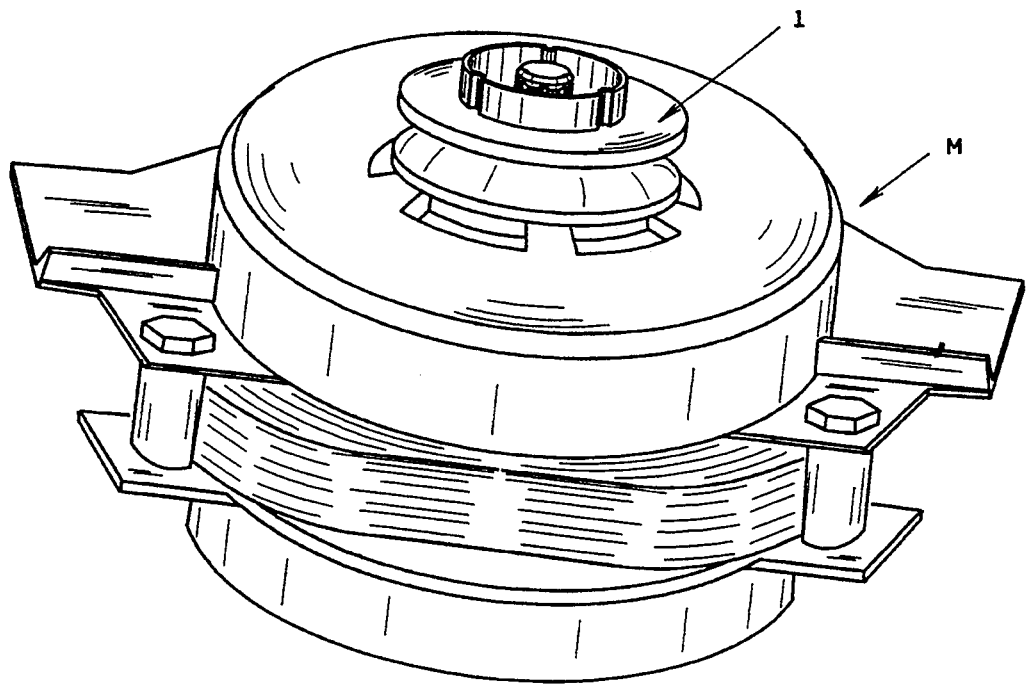
FIG. 1 is a perspective view of a motor showing one illustrated embodiment of a pulley employing the retention mechanism of the present invention.

Referring now to the drawings which are shown for the purpose of illustrating a preferred embodiment of the invention and not for the purpose of limiting the invention, FIG. 1 shows a perspective view of an electric motor M suitable for mounting in a home appliance, for example, a washing machine. Motor M has a pulley and shaft assembly to pull on the retention mechanism of the present invention shown generally at 1.

Figure 2:
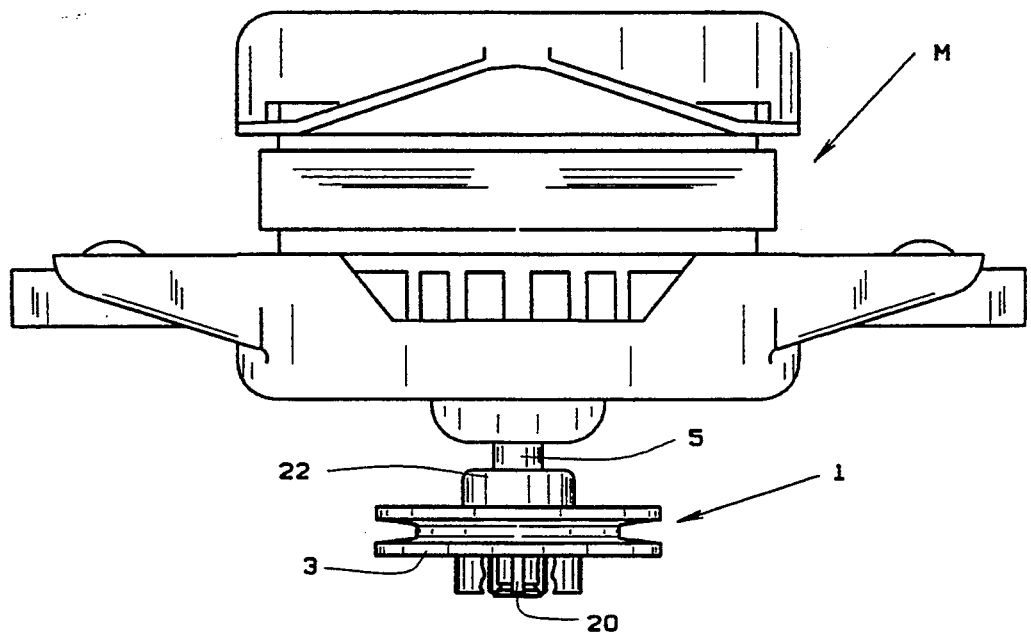
FIG. 2 is a side view of the motor shown in FIG. 1, illustrating the mounting arrangement employed in use.
Figure 3:
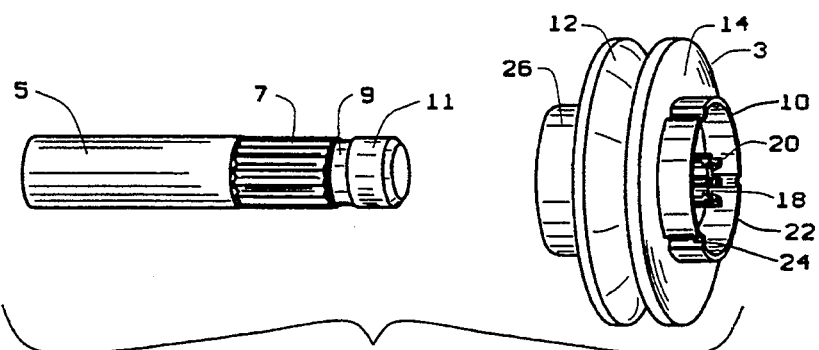
FIG. 3 is an exploded view of a shaft and a pulley employing the retention mechanism of the present invention.

FIG. 2 discloses another view of motor M as well as retention mechanism 1. FIG. 2 corresponds generally to an installed position of motor M. Mechanism M includes a pulley 3 and an elongated shaft 5 as best illustrated at FIG. 2. Shaft 5 has a plurality of splines 7, illustrated in FIG. 3, a circumferential groove 9 and beveled head 11 formed thereon and therein for purposes that will be explained hereinafter. Pulley 3 includes a first sheave 12 and a second sheave 14 integrally formed to one another and to a hub 16. The hub 16 has an axial opening 18 formed in it. A plurality of fingers 20 are formed around the opening 18 and extend axially outward therefrom on a first side of pulley 3. A protective collar 22 having a plurality of indentations as at 24 formed therein surrounds fingers 20 and extends axially outward from the first side of pulley 3. An annular shoulder 26 is formed on a second side of pulley 3 for purposes described in greater detail hereinafter. It will be appreciated by those skilled in the art, the pulley 3 preferably is one piece construction. The entire mechanism includes merely the pulley 3 and the shaft 5.

Figure 4:
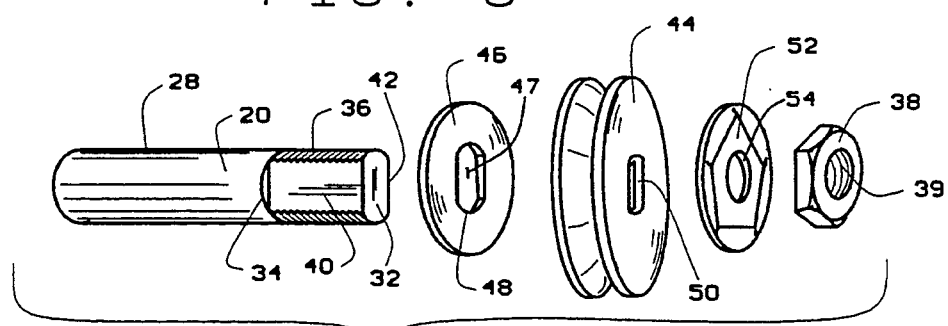
FIG. 4 is an exploded view, labeled as prior art, of a shaft and pulley assembly.

By contrast FIG. 4 illustrates a shaft and pulley assembly known to the prior art. The shaft shown generally at 28 has a larger diameter body portion 30 and formed portion 32. The portions 30 and 32 define a shoulder 34 at their junctions. Portion 32 has threads 36 formed thereon to accommodate a threaded nut 38. Portion 32 is specially formed so that it has rectangular walls 40 and 42 which function to engage a pulley 44 as will be explained.

Washer 46 has an axial opening 47 with rectangular side walls 48 formed in it and is mated over shaft portion 32 until it abuts shoulder 34. In the prior art embodiment, washer 46 helps position pulley 44. Pulley 44 has a central opening 50 formed in it, the shape of which corresponds to the shape of shaft portion 32. Opening 50 is sized to prevent movement of its pulley 44 on the shaft portion 32 until it abuts washer 46. The corresponding shapes of portion 32 and opening 50 allows the shaft to engage and drive pulley 44. A retaining ring 52, with a hole 54 formed in the center thereof, slides over portion 32 to function both as a washer and as a spacer to accommodate differences in tolerance in the motor shaft assembly. Finally, nut 38, having a threaded hole 39 therein is tightened on threads 36 to secure the pulley on the shaft. As can be seen from this description and the accompanying illustration, the prior art arrangement requires a plurality of parts and substantial assembly.

Figure 5:
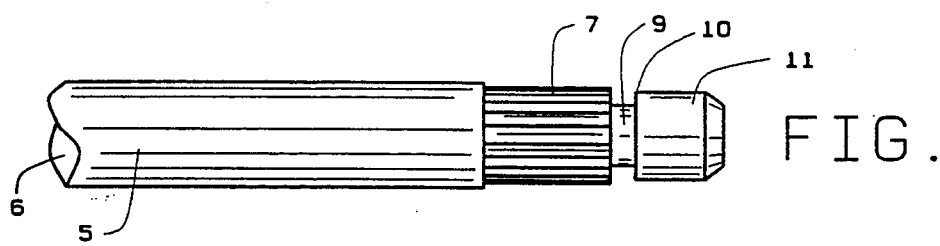
FIG. 5 is a side elevational view of the shaft component of the present invention.

Turning now to a detailed description of the shaft component of the mechanism of the present invention as best illustrated in FIG. 5, shaft 5 is a generally elongate motor shaft having end 6 which has the rotor (not shown) of a dynamoelectric machine mounted to it in any conventional way. Shaft 5 rotates with the rotor in a conventional manner. The working end of shaft 5 has a beveled head 11 as previously described which is designed to allow the pulley 3 to slip over head 11 easily. Shaft 5 can be made of any appropriate material, such as steel, and can be any appropriate length so as to be suited for the intended use in a motor. A plurality of splines 7 are formed on surface of shaft 5. The dimensions of splines 5 as well as the location of splines 7 on shaft 5 are variable, depending upon the width and placement of the pulley or other hub containing element to be mounted on shaft 5. A circumferential groove 9 is formed on shaft 5 between spline and head 11. The overall dimension of groove 9 can vary without departing from the scope of the invention. Groove 9 must be of proper width and depth so as to properly seat a plurality of pawls formed on the end of the fingers on the hub as will be described in detail below. Groove 9 is formed with a sharp edge 10 at the shaft 5 surface. Edge 10 is intended to abut the pawls on the pulley component to prevent backout of the pulley as will be explained below.

Figure 6:
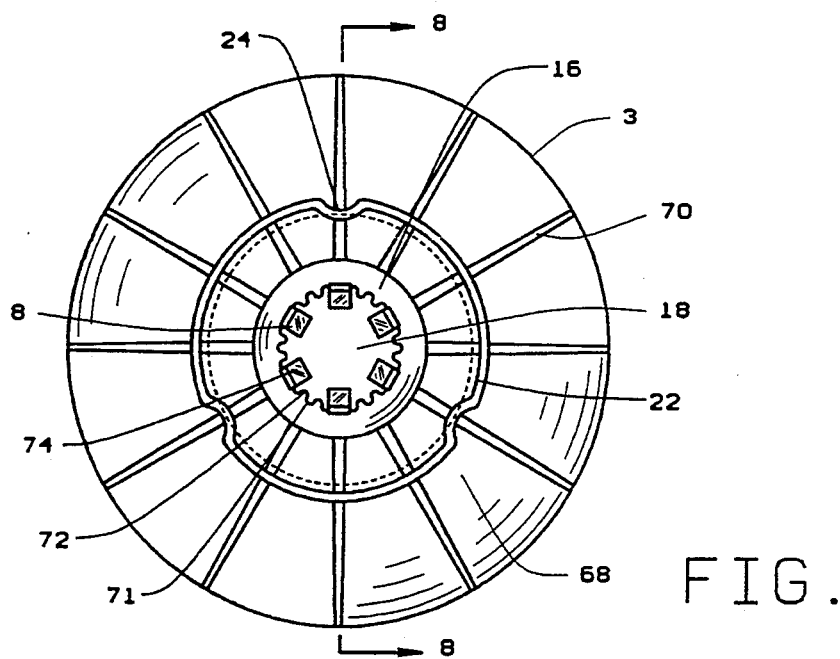
FIG. 6 is a top plan of a pulley component employing the retention mechanism of the present invention.
Figure 7:
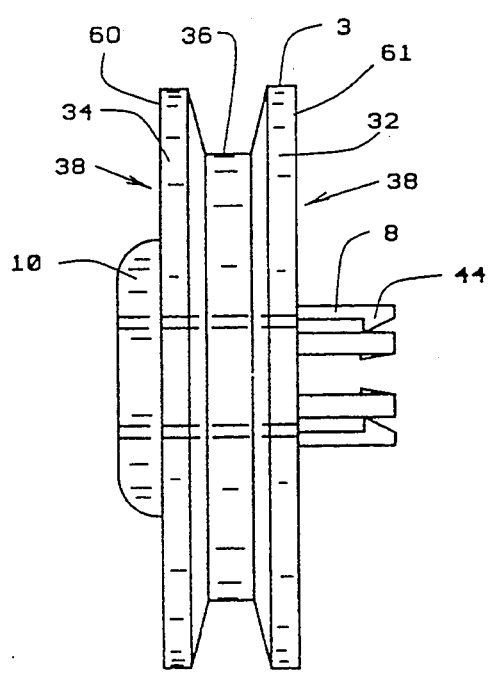
FIG. 7 is a side elevational view of a pulley component employing the retention mechanism of the present invention.
Figure 8:
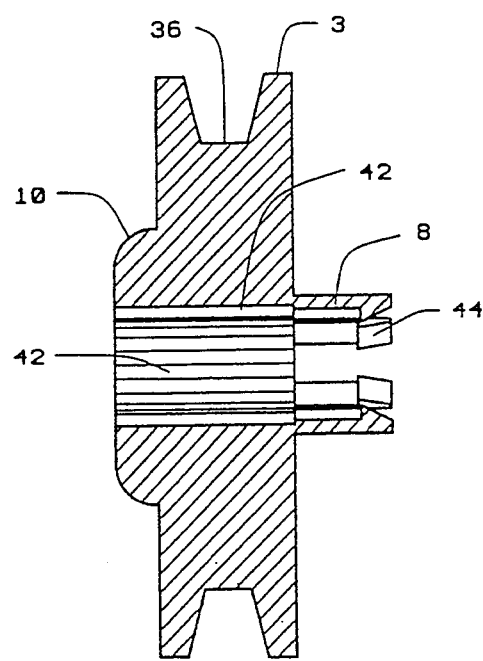
FIG. 8 is a cross sectional view taken along line 8—8 of FIG. 6.
Figure 12:
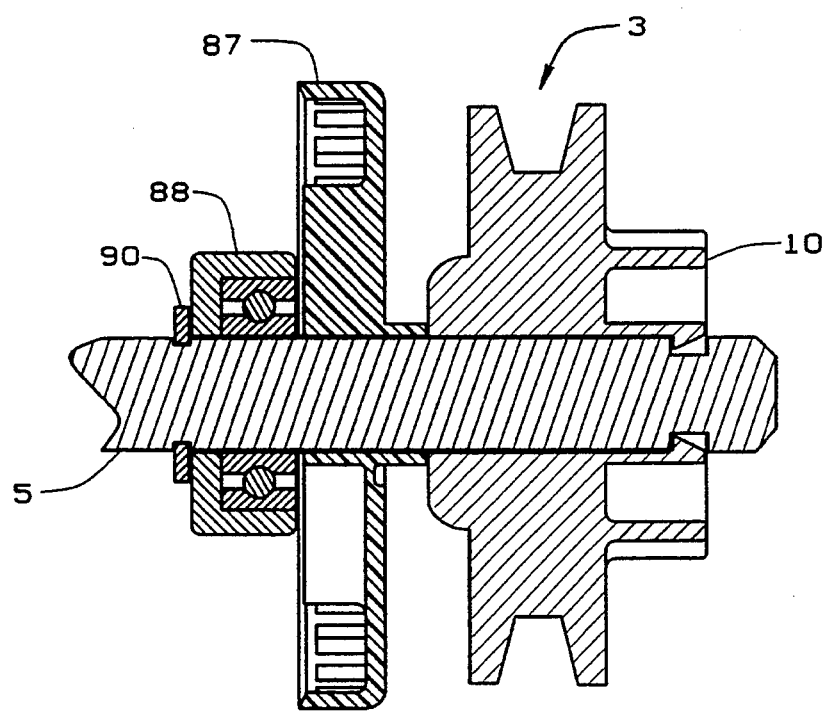
FIG. 12 is a side elevational view, partially cut away, of an alternative arrangement of a pulley component employing the retention mechanism of the present invention.

Turning now to a more detailed description of the hub containing element of the present invention, as illustrated as a pulley in FIGS. 6–8. Pulley 3 is defined by the shearing parts 12 and 14 having outer sides 60 and 62 respectively. Sheave parts 12 and 14 define a groove 64. Groove 64 is designed to accommodate a conventional drive belt (not shown). The drive belt may have a V or other useful configuration. Pulley 3 is formed from any suitable material such as molded high impact plastic or resin. Sheave portions 12 and 14, in the embodiment shown, have a generally concave surface 68 with radially extending members 70 radiating out from hub 16. Hub 16 has an axial opening 18 formed in it. The hub 16 has shoulder 26 formed on the sheave 12 side of the pulley. Shoulder 26 functions both as a means to abut a shoulder on shaft 5 when pulley 3 is mounted on shaft 5 and is a spacer to align pulley 3 properly on shaft 5 when assembled. It should be noted that pulley 3 could abut a structure other than a shoulder formed on the shaft. For example, as illustrated in FIG. 12, pulley 3 is mounted on shaft 5. Fingers 20 engage groove 9. Shoulder 26 abuts a fan 87 which in turn abuts bearing 85 and retaining ring 90.

Opening 4 has a plurality of splines 71 which define keyways 72 running along axis of opening 18. Keyways 72 are of such width and depth so as to receive splines 7 of shaft 5. When assembled, splines 7 matingly fit in keyways 72 so as to allow shaft 7 to engage pulley 3 and drive it positively.

Pulley 3 has a plurality of fingers 20 extending axially outward from and about the perimeter of opening 18 on hub 16 of pulley 3. Fingers 20 are flexible so that they move radially outward as the pulley 3 is placed over head 11 of shaft 9 but return to their original position when pulley 3 is in place. Each finger 20 has a pawl such as at 74 formed on its axially outward end.

In use, opening 18 of pulley 3 is positioned over head 11 on shaft 5. Pulley 3 is aligned so that splines 7 engage keyway 72 within opening 20. Pulley 3 is forced on to shaft 5 causing fingers 20 to spread radially outward allowing the shaft to pass through fingers 20 and pawls 74. When pawls 74 align with groove 9 formed on shaft 5, pawls 74 spring back into groove 9, thereby locking pulley 3 in place. The dimensions of pulley 3 are such that shoulder 26 abuts shoulder 6 in shaft 5 to further stabilize the assembly. Alternatively, shoulder 26 can abut another element, such as fan 87 as illustrated in FIG. 12. Square edge 10 of groove 9 abuts pawl 74 and the spring action of the fingers 20 further secure the hub/shaft assembly and prevents back off of the hub.

Figure 9:
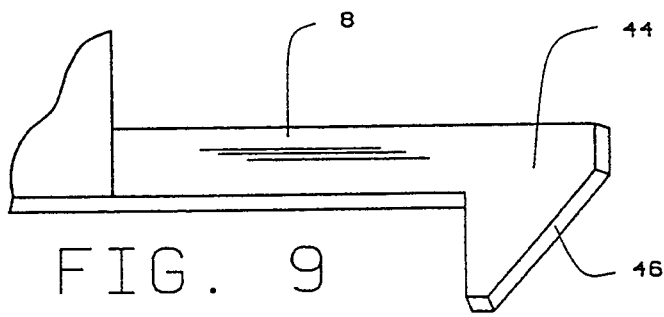
FIG. 9 is an enlarged side elevational view of the finger and pawl element formed on a pulley employing the retention mechanism of the present invention.

Pawls 74 can assume various shapes or configurations depending upon the intended use and depending upon application tolerances. For example, pawls 74 as best seen in FIG. 9 is of generally V-shaped configuration. A front surface 76 is generally flat and is disposed to engage sharp edge 58 of groove 9. The abutment of edge 58 and surface 76 prevents backout of the pawl as previously described.

Figure 10:
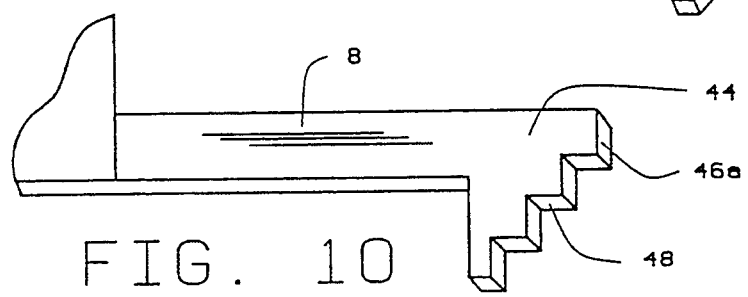
FIG. 10 is an enlarged side elevational view of one alternative embodiment of the finger and pawl element of the present invention.

FIG. 10 illustrates another embodiment of pawl 74. The surface 78 is formed with a stair step configuration. That is, a plurality of notches 80 are formed in surface 78. Size and spacing of notches 80 may vary depending upon the intended use of the assembly without departing from the scope of the invention. Any one of the notches as shown at 80 may engage edge 58 of groove 9 so as to secure the pawl and place depending upon the tolerance of shaft 5. In this manner slight variations or tolerance in the drive position of pulley 3 may be accommodated.

Figure 11:
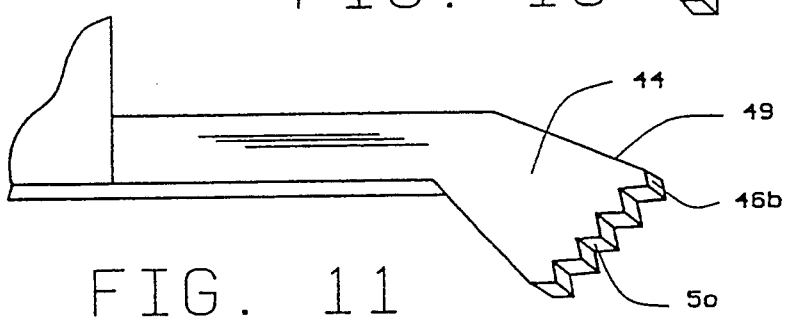
FIG. 11 is an enlarged side elevational view of another alternative embodiment of the finger and pawl element of the present invention.

FIG. 11 illustrates yet another embodiment of the pawl 20. A surface 82 is angled downward and front surface 84 is formed with sawtooth configuration. That is, the surface 84 has a plurality of teeth 86 formed in it. Again, this configuration permits the accommodation of variations in axial portion of pulley 3.

Those skilled in the art, will realize that different configurations of pawls may be utilized on the same pulley. For example, every other pawl could be V-shaped and every other pawl could employ stair step configuration depending upon the intended use and tolerance of the shaft.

Figure 13:
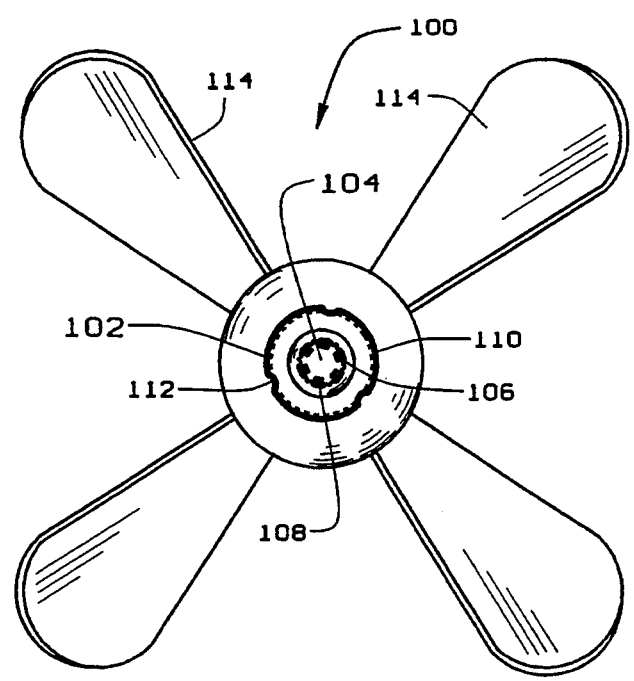
FIG. 13 is a perspective view of a fan blade assembly employing the retention mechanism of the present invention.

It should also be noted that the retaining mechanism may be employed on other hub containing elements other than a pulley without departing from the scope of the invention. For example, as shown in FIG. 13, a fan blade assembly 100 is illustrated employing the unique retention mechanism of the present invention. The fan blade assembly as a hub 102 having an axial hole 104 a plurality of fingers as at 106 extend outward from around hole 104 and terminate in pawls 108. A protective collar 110 surrounds the fingers. Protective collar 110 has a plurality of indentations 112 formed therein so as to prevent the innerlocking of the fan blade assembly with other fan blade assemblies during manufacture, shipping or storage. A plurality of fan blades 114 radiate out from hub 102 as in any other conventional fan. The fan blade assembly 100 can be mounted on a shaft, of the type as shown in FIG. 5 and be retained on the shaft in the same manner as the previously described pulley 3. Fan blade assembly 100 as shown in FIG. 13 is intended to be illustrative of the numerous variations of hub containing elements which can utilize the unique retention mechanism previously described. For example, in addition to the fan blade assembly, the unique mechanism for use retaining a hub containing element on a shaft can be used with a centrifugal actuator assembly, impel let, gear or the like.

Numerous variation within the scope of the appended claims will be apparent to those skilled in the art. While a particular plastic was described as preferred, other materials may be utilized, if desired. Furthermore, a single keyway as opposed to the spline plurality, may be used to positively drive the pulley. These variations are merely illustrative.

What is claimed:

1. A mechanism for retaining a hub-containing element on a rotatable shaft comprising:
   a shaft having a circumferential groove formed in an end thereof;
   a hub-containing element having an axial hole formed in the hub to engage said shaft; and
   at least one finger formed around and extending axially outward from said hole, said finger disposed to engage said groove when said hub-containing element is assembled on said shaft to position said element on said shaft.

2. The invention of claim 1 further comprising a collar means formed around and extending axially outward from said hole and surrounding said fingers to protect said fingers from entanglement or breakage.

3. The invention of claim 1 wherein said hub-containing element is a pulley.

4. The invention of claim 1 wherein said hub-containing element is a fan.

5. The invention of claim 1 wherein said finger has a pawl formed on an end thereof, said pawl disposed to engage an edge of said groove in said shaft in the mounted position of said element.

6. The invention of claim 1 wherein said element has a plurality of Singers formed around said axially hole.

7. The invention of claim 5 wherein said pawl has a stepped face.

8. The invention of claim 5 wherein said pawl has a saw-toothed face.

9. The invention of claim 5 wherein said shaft has at least one spline formed in it and the axial hole in said hub has at least one keyway formed in it, said keyway being sized to receive said spline.

10. The invention of claim 9 wherein said shaft has a plurality of splines formed in it and said axial hole in said hub has a corresponding number of key ways formed in it.

11. A mechanism for securing a hub-containing element to a shaft comprising:
- a shaft, said shaft having a circumferential groove formed in an end thereof;
- a hub-containing element, said element having an axial hole formed in said hub disposed to engage said shaft;
- at least one finger formed around at and extending axially outward from said hole, said finger disposed to engage said groove when said hub is assembled on said shaft; and
- a protective means surrounding said finger to prevent entanglement or breakage of said finger during manufacture, storage or assembly of said element.

12. A mechanism for securing a hub on a motor shaft comprising:
- an elongated shaft, said shaft having a first end and a second end, said first end disposed to seat within the motor so as to be rotatable therein, said second end having an annular groove formed thereon, said second end having a plurality of spines formed thereon proximate to said groove;
- a hub, said hub having an axial hole formed therethrough to engage said shaft, said hub having a plurality of flexible fingers formed around and extending outward from said hole, each said finger having a pawl formed on an end thereof and disposed to drop in said annular groove on said shaft thereby securing said pulley on said shaft, said hub also having a plurality of keyways formed therein, said keyways disposed to matingly engage said spines on the shaft; and
- a collar means surrounding said fingers and extending axially out from said hub and disposed to protect said fingers from entanglement and breakage during manufacture, storage, or assembly.

13. The invention of claim 12 wherein said collar means further includes a plurality of internal indentations to prevent the interlocking of said collar with other said elements during molding, transportation, or assembly.

14. In a motor having a shaft and a pulley assembly, an improvement for securing the pulley on the shaft, comprising:
- a shaft having a plurality of splines formed on one end;
- a circumferential groove formed on said shaft proximate said spline;
- a pulley having a hub formed therein to engage said shaft, said hub having a plurality of splines formed therein, said splines disposed to matingly engage said splines on said shaft thereby preventing said shaft from rotating with said hub;
- a plurality of fingers, said fingers formed around and extending outward from said hub, said fingers disposed to engage said groove formed on said shaft; and
- a collar means extending outwardly from said hub and surrounding said fingers so as to protect said fingers.

* * * * *

UNITED STATES PATENT AND TRADEMARK OFFICE
CERTIFICATE OF CORRECTION

PATENT NO. : 5,370,587
DATED : 12/6/94
INVENTOR(S) : Johnson et al.

It is certified that error appears in the above-indentified patent and that said Letters Patent is hereby corrected as shown below:

Column 7, line 6, delete "Singers" and insert --fingers--.

Signed and Sealed this

Eighteenth Day of April, 1995

*Attest:*

*Attesting Officer*

BRUCE LEHMAN

*Commissioner of Patents and Trademarks*